United States Patent

Tracy et al.

[11] 4,063,749
[45] Dec. 20, 1977

[54] CENTER POINT TRAILER HITCH

[76] Inventors: Gordon A. Tracy, P.O. Box 326, Ramona, Calif. 92065; David L. Forrest, 1631 Harbison Canyon Road, El Cajon, Calif. 92021

[21] Appl. No.: 705,930

[22] Filed: July 16, 1976

[51] Int. Cl.² .......................................... B62D 53/04
[52] U.S. Cl. ................................................ 280/423 R
[58] Field of Search ............... 280/423 R, 423 B, 495, 280/496, 497, 503; 296/100

[56] References Cited
U.S. PATENT DOCUMENTS

| | | | |
|---|---|---|---|
| 2,628,106 | 2/1953 | Sturwold | 280/423 B |
| 3,390,896 | 7/1968 | Philapy | 280/423 R |
| 3,801,135 | 4/1974 | Winter | 280/423 R |
| 3,825,281 | 7/1974 | Howard | 280/423 R |
| 3,936,077 | 2/1976 | Bliek | 296/100 X |

*Primary Examiner*—Joseph F. Peters, Jr.
*Assistant Examiner*—R. Schrecengost
*Attorney, Agent, or Firm*—Knox & Knox

[57] ABSTRACT

A trailer hitch designed particularly for converting pleasure type automobiles into towing vehicles and for trailers having a gooseneck forwardly projecting front end, a principal object being to minimize fishtailing of the coupled units and to improve handling of the towing vehicle and also to provide a hitch configured for use on different models of cars with minimum difficulty in adaptation, the hitch being largely hidden in the luggage compartment.

2 Claims, 5 Drawing Figures

CENTER POINT TRAILER HITCH

BACKGROUND OF THE INVENTION

The proliferation of trailers has not been without problems relating to safety and easy handling of the same, especially in regard to larger trailers and operation of the coupled vehicles at higher speeds. A principal hazard involves the tendency for a heavy trailer to fishtail and sway the towing vehicle, making the handling of the towing vehicle difficult except at slow speed. This difficulty is greatly minimized where fifth wheel assemblies are provided as in some trucks but in most instances the hitch is located at the rear of a pleasure car, well behind the rear ground contacting wheels. Several proposals involving hitches mounted on structure saddling the vehicles body or attached to the roof of the vehicle have been developed and some of these have been patented but there remains a need for a simpler, economical and safe hitch means for use with passenger vehicles, especially those vehicles having a trunk compartment.

SUMMARY OF THE INVENTION

The hereinafter described invention meets the immediately above mentioned need for a hitch that is somewhat universally adapted for use with different pleasure automobiles having a trunk compartment, with the functionality of the rear deck lid being retained, and the forward end weight load of the trailer being localized on the underbody of the towing automobile directly above the rear axle of the automobile. Thus the safety and ease of handling of the automobile is maximized while the trunk compartment is still accessible.

As claimed, the invention has two sub-assemblies, one mounted on the underbody of the towing vehicle and the other on the trailer which necessarily has a forwardly extended and elevated front end portion, the latter assembly being essentially a depending pillar, the two sub-assemblies being releasibly and pivotally connected together. As further more specifically claimed, the depending pillar extends through an upper back panel or the equivalent through an opening which can be closed when the trailer is removed, and the sub-assembly is set forth as secured to the underbody by means of sills mounted above the suspension members, stabilized by strap-like attaching members and bearing a cross-beam extending transversely of the vehicle, parallel to the axle, with the lower pivotal connection member carried by this cross-beam and thus located vertically above and centered with respect to the rear axle of the automobile.

DETAILED DESCRIPTION OF A PREFERRED EMBODIMENT

Figure 1:
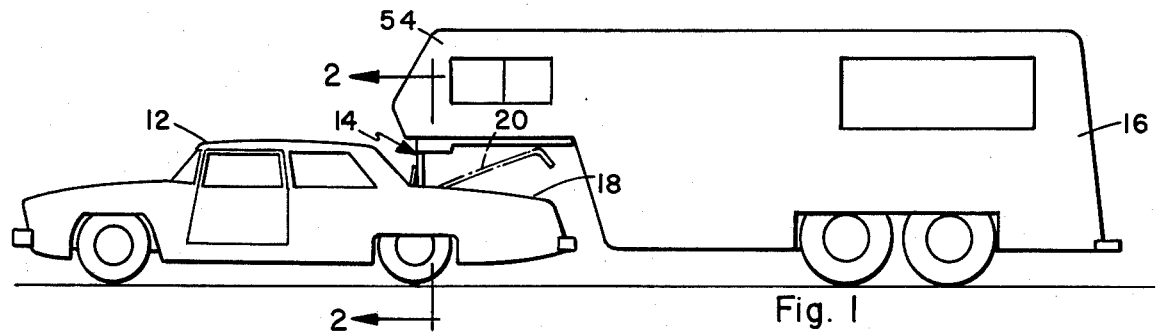
FIG. 1 is a side elevation view of the passenger automobile towing vehicle and trailer with hitch partially visible and with the deck lid indicated in open position.
Figure 2:
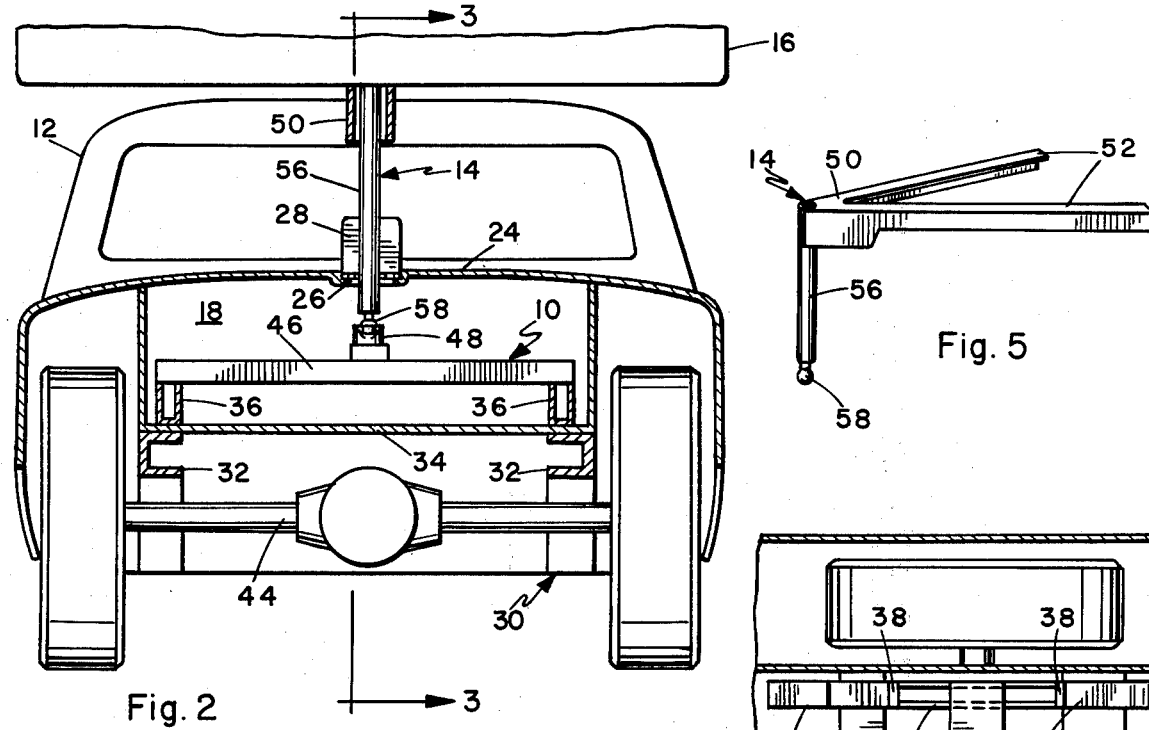
FIG. 2 is an enlarged sectional view taken on line 2—2 of FIG. 1.
Figure 5:
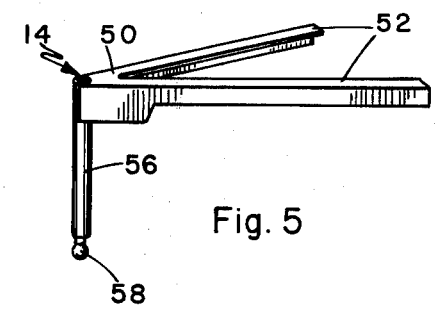
FIG. 5 is a perspective view of the tow bar unit for attachment to the trailer.

As illustrated in the drawing this invention relates to a trailer hitch assembly in two main assemblies, one sub-assembly generally indicated by the numeral 10 being substantially permanently on the towing vehicle 12 and the other sub-assembly 14 is mounted on the trailer, generally indicated at 16.

The towing vehicle 10 shown is representative and is a passenger automobile with a rear deck or luggage compartment 18 and a rear deck lid 20 which is hinged as at 22 to the upper deck panel 24. A third sub-assembly will be recognized as an opening 26 which is preferably disposed centrally of the upper deck panel 24 and adjacent to the hinge 22. The opening 26 is closed by a small door 28 when the hitch is not in use. While admittedly structurally simple, this door 28 is quite important inasmuch as it restores the integrity of the upper back panel when the trailer 14 is not coupled with the pleasure car, which latter is therefore virtually indistinguishable from its form prior to its adaptation as a towing vehicle, the sub-assembly 14 having been removed and the sub-assembly 10 being entirely hidden within the luggage compartment 18.

Figure 3:
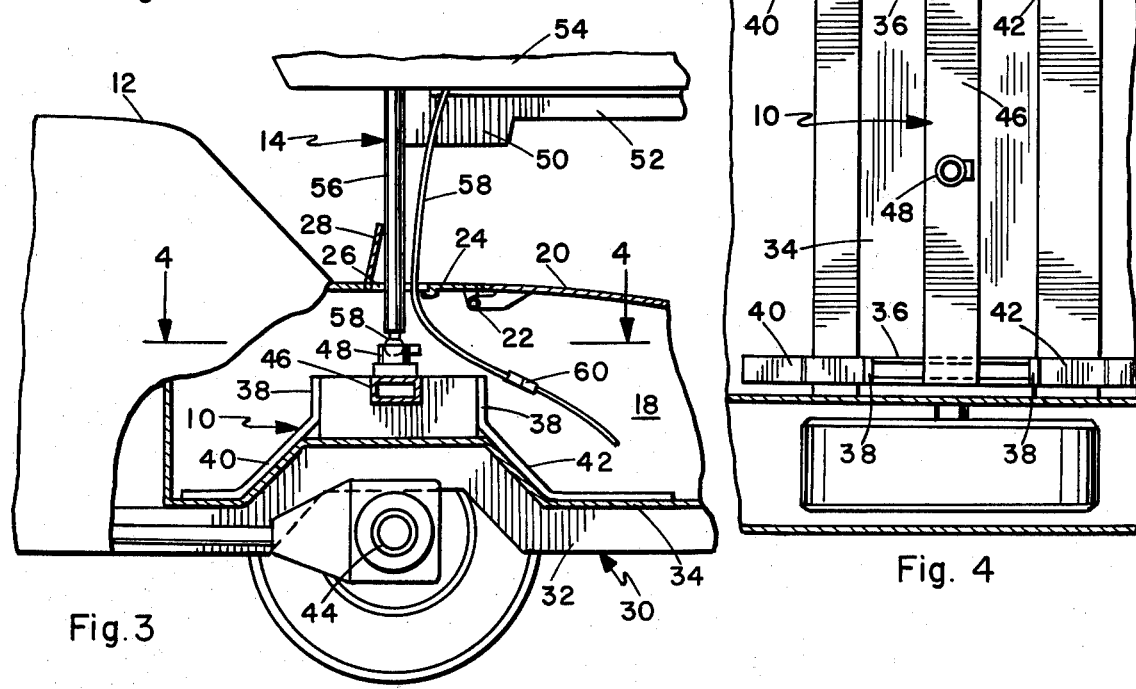
FIG. 3 is a sectional view taken on line 3—3 of FIG. 2.
Figure 4:
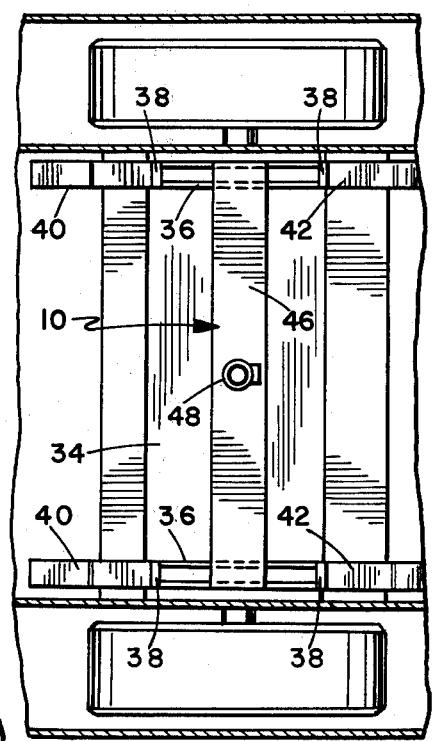
FIG. 4 is a horizontal sectional view taken on line 4—4 of FIG. 3.

The towing vehicle 12 has an underbody generally indicated by its numeral 30 including the suspension members 32 and rear floor pan 34 ordinarily welded therto. A pair of opposing sills 36 which are preferably of box type are rigidly secured to the underbody 30 by welding if desired and by attachment straps 38 extending fore and aft from each sill, as indicated at 40 and 42 and ordinarily welded to the rear floor pan 34 and of course to the individual sills. This configuration of sills 36 and straps 38 renders the sub-assembly 10 capable of easy attachment to virtually all automobiles which are otherwise suitable for use with this invention since the straps can be bent to conform with the configuration of the underbody. Where the suspension members and floor pan have flats vertically above the rear axle 44 of the towing vehicle the sills, as illustrated in FIG. 3, can be secured as shown. These sills can be of box type or u-shaped in cross-section as illustrated, the essential features being reasonable strength and lightness, and a cross-beam 46 is welded or otherwise secured to and between the sills. This cross-beam is preferably of box type to assure sturdiness and at the top center thereof has a split socket 48 or equivalent fixed thereon, thus completing the sub-assembly 10.

The sub-assembly 14 includes a rigid frame 50, illustrated as being constructed of two converging angle stock arms 52 for securement to the underside of an elevated forwardly extending or gooseneck portion 54 of the trailer 16. The forward end portion of the frame 50 has welded thereto the upper end of a depending pillar 56 which has at its lower end a ball 58, or equivalent, releasibly mounted in the socket 48.

The operation of this invention will be obvious from a consideration of the foregoing except that it may be mentioned that the necessary electric cables and the like illustrated at 58, establish brake and turn signals and other communication between the towing vehicle and trailer, can also be conveniently routed through the opening 26, disconnects as indicated at 60 making it possible to have the same completely hidden by closure of the door 28 when the towing vehicle is being used as a pleasure automobile without the trailer.

We claim:

1. A trailer hitch assembly for releasable connection of a towing vehicle having an underbody, a luggage compartment with a deck lid, an upper back panel to which the deck lid is hinged and a rear axle, with a trailer having an elevated forwardly extending portion, said hitch comprising:

a.
1. a sub-assembly in a towing vehicle and including a support rigidly secured to the top of a portion of the underbody of the vehicle within the luggage compartment, vertically beneath the upper back panel and vertically above the rear axle of the towing vehicle, said upper back panel having a centrally disposed opening therein;
2. a pivot connector member mounted on said support;

b.
1. a sub-assembly rigidly mounted on an elevated forwardly extending portion of a trailer and including a rigid depending pillar extending, in use, through said opening;
2. a second pivot connector member on the lower end of said depending pillar for releasable connection with the first mentioned connector member said pillar and sub-assemblies being proportioned to permit opening of said deck lid to give access for effecting said releasable connection;

c.
1. a closure member for said opening when said depending pillar is removed, as in the disconnection of the trailer, said closure member when closed restoring the integrity and the aesthetic appearance of the upper back panel.

2. A trailer hitch according to claim 1 wherein said underbody includes suspension members and said support includes horizontal opposed sills secured to the underbody substantially above said suspension members, and a horizontal cross-beam terminally secured to and between said sills;

attachment straps secured to and extending forward and aft from said sills, whereby attachment of said support to variously configured underbodies is facilitated;

the first mentioned pivot connection member being mounted on said cross-beam.

* * * * *